(12) United States Patent
Watanabe

(10) Patent No.: US 9,895,815 B2
(45) Date of Patent: *Feb. 20, 2018

(54) MULTIPLE JOINTS ROBOT WITH MECHANISM FOR COOLING MOTOR

(71) Applicant: FANUC CORPORATION, Minamitsuru-gun, Yamanashi (JP)

(72) Inventor: Hideyuki Watanabe, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 96 days.

This patent is subject to a terminal disclaimer.

(21) Appl. No.: 15/152,595

(22) Filed: May 12, 2016

(65) Prior Publication Data

US 2016/0250759 A1 Sep. 1, 2016

Related U.S. Application Data

(62) Division of application No. 14/015,810, filed on Aug. 30, 2013, now Pat. No. 9,364,956.

(Continued)

(30) Foreign Application Priority Data

Aug. 31, 2012 (JP) .................. 2012-191342

(51) Int. Cl.
   *B25J 19/00* (2006.01)
   *H02K 9/22* (2006.01)
   (Continued)

(52) U.S. Cl.
   CPC ........ *B25J 19/007* (2013.01); *B25J 19/0054* (2013.01); *H02K 9/00* (2013.01);
   (Continued)

(58) Field of Classification Search
   CPC ....... B25J 19/007; B25J 19/0054; H02K 9/20; H02K 9/22; H02K 9/00; Y10T 74/20317;
   (Continued)

(56) References Cited

U.S. PATENT DOCUMENTS

| 4,191,240 A | 3/1980 | Rule et al. |
| 5,906,236 A | 5/1999 | Adams et al. |

(Continued)

FOREIGN PATENT DOCUMENTS

| CN | 201230257 Y | 4/2009 |
| CN | 101772879 A | 7/2010 |

(Continued)

OTHER PUBLICATIONS

Office Action in DE Application No. 102013014274.1, dated Apr. 15, 2016.

*Primary Examiner* — Jason L Vaughan
*Assistant Examiner* — Amanda Meneghini
(74) *Attorney, Agent, or Firm* — Hauptman Ham, LLP

(57) ABSTRACT

A multiple joint robot includes a movable body, a motor for generating power to actuate the movable body, a motor housing for accommodating the motor, and a cooling structure for dissipating heat generated from the motor. The cooling structure includes a heat conductor in the motor housing, and the heat conductor forms a heat conductive path for transmitting heat from the motor to the motor housing. The heat conductor has a first surface in contact with a heat generating surface of the motor and a second surface in contact with an inner surface of the motor housing. A position of the heat conductor can be adjusted to form the heat conductive path by sliding the first surface and/or the second surface along the opposed heat generating surface or inner surface.

3 Claims, 7 Drawing Sheets

Related U.S. Application Data

(60) Provisional application No. 61/697,914, filed on Sep. 7, 2012.

(51) Int. Cl.
*H02K 9/20* (2006.01)
*H02K 9/00* (2006.01)

(52) U.S. Cl.
CPC ............... *H02K 9/20* (2013.01); *H02K 9/22* (2013.01); *Y10T 74/20317* (2015.01)

(58) Field of Classification Search
CPC ............. Y10T 29/4935; Y10T 29/4984; Y10T 29/49861; Y10T 29/49892; Y10T 29/49904; Y10T 29/49947; Y10T 29/49963; H01L 2023/4062
USPC .................................................. 165/168–170
See application file for complete search history.

(56) References Cited

U.S. PATENT DOCUMENTS

| | | |
|---|---|---|
| 7,347,120 B2 | 3/2008 | Friedrich et al. |
| 2002/0014874 A1* | 2/2002 | Hietmann ............ B25J 19/0054 318/568.12 |
| 2005/0115352 A1 | 6/2005 | Tanaka |
| 2007/0096673 A1 | 5/2007 | Hagn |
| 2009/0195089 A1 | 8/2009 | Huang et al. |
| 2009/0266194 A1 | 10/2009 | Zhang et al. |
| 2010/0126703 A1* | 5/2010 | Ruan .................... F28D 15/0275 165/104.33 |
| 2010/0319896 A1 | 12/2010 | Rajaraman |

FOREIGN PATENT DOCUMENTS

| | | |
|---|---|---|
| DE | 280189 A | 5/1913 |
| DE | 10349452 A1 | 5/2005 |
| JP | 62-25193 U | 2/1987 |
| JP | 01-274993 A | 11/1989 |
| JP | 09-323286 A | 12/1997 |
| JP | 10174371 A | 6/1998 |
| JP | 10290550 A | 10/1998 |
| JP | 2006180643 A | 7/2006 |

* cited by examiner ial application of U.S.
MULTIPLE JOINTS ROBOT WITH MECHANISM FOR COOLING MOTOR

RELATED APPLICATIONS

The present application is a divisional application of U.S. patent application Ser. No. 14/015,810, filed Aug. 30, 2013, which is based on, and claims priority from Japanese Application Number 2012-191342, filed Aug. 31, 2012, and U.S. Provisional Application No. 61/697,914, filed Sep. 7, 2012 the disclosure of which is hereby incorporated by reference herein in its entirety.

BACKGROUND OF THE INVENTION

1. The Field of the Invention

The present invention relates to a multiple joint robot.

2. Description of the Related Art

A multiple joint robot is often used in a harsh environment that is frequently exposed to splashes or dust, or in a corrosive environment. Thus, components such as a motor for driving an arm are often accommodated in the interior isolated from the exterior in order to prevent malfunction thereof. Such a configuration tends to make it difficult to sufficiently dissipate heat generated from a heat source such as the motor when the robot is in operation. JP-U-62-25193, JP-A-1-274993, and JP-A-9-323286 disclose a structure for enhancing a heat releasing effect by providing a heat conducting member in a gap between a heat generating portion of a motor and a structural member of a robot.

There is still a need for a multiple joint robot provided with a cooling structure for cooling a motor accommodated in a closed space.

SUMMARY OF THE INVENTION

According to a first aspect, a multiple joint robot comprises: a movable body; a motor for generating power to actuate the movable body; a motor housing for accommodating the motor in an interior thereof so as to isolate the motor from an exterior; and a cooling structure for cooling the motor by dissipating heat generated from the motor, wherein the motor has a heat generating surface on which heat is generated, wherein the cooling structure includes a heat conductor situated in the interior of the motor housing, the heat conductor forming a heat conducting path for conducting heat from the motor to the motor housing, and wherein the heat conductor has a first contact surface adapted to be in contact with the heat generating surface of the motor, and a second contact surface adapted to be in contact with an inner surface of the motor housing, so as to form the heat conducting path through an adjustment of a position of the heat conductor by sliding at least one of the first contact surface and the second contact surface on the opposed heat generating surface or inner surface.

According to a second aspect, in the multiple joint robot according to the first aspect, the heat generating surface of the motor and the inner surface of the motor housing extend in an inclined manner relative to each other, and the first contact surface and the second contact surface extend in an inclined manner relative to each other, so as to form an angle therebetween, respectively, and the heat conductor is adapted to form the heat conducting path by sliding one of the first contact surface and the second contact surface of the heat conductor on the opposed heat generating surface or inner surface, until the other of the first contact surface and the second contact surface comes in contact with the opposed heat generating surface or inner surface.

According to a third aspect, in the multiple joint robot according to the first aspect, the heat generating of the motor and the inner surface of the motor housing extend parallel to each other, and the first contact surface and the second contact surface of the heat conductor extend parallel to each other, respectively, the heat conductor includes a first heat conductor forming the first contact surface and a second heat conductor separate from the first heat conductor, the second heat conductor forming the second contact surface, and the heat conductor is adapted to form the heat conducting path by sliding one of the first contact surface of the first heat conductor and the second contact surface of the second heat conductor on the opposed heat generating surface or inner surface, until the first heat conductor and the second heat conductor comes in contact with each other.

These and other objects, features and advantages of the present invention will become more apparent in light of the detailed description of exemplary embodiments thereof as illustrated by the drawings.

DETAILED DESCRIPTION OF THE INVENTION

Embodiments of the present invention will be described below with reference to the accompanying drawings. Constituent elements of the illustrated embodiments may be modified in size for better understanding.

Figure 1:
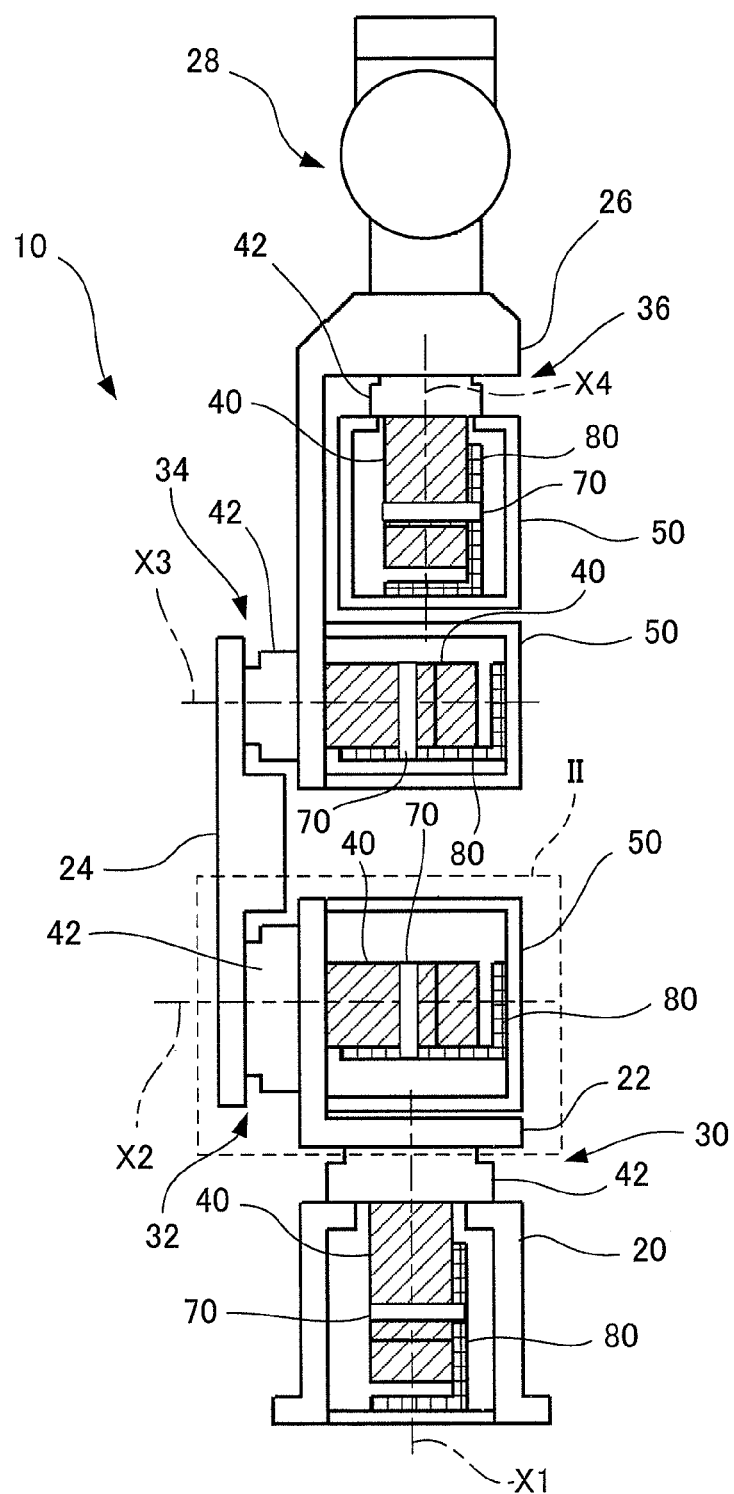
FIG. 1 is a sectional view schematically illustrating a multiple joint robot according to a first embodiment.

FIG. 1 is a sectional view schematically illustrating a multiple joint robot 10 according to a first embodiment. The robot 10 includes a base 20 mounted on a mounting surface, a first arm 22 coupled to the base 20 via a joint 30, a second arm 24 coupled to the first arm 22 via a joint 32, a third arm 26 coupled to the second arm 24 via a joint 34, and a wrist part 28 coupled to the third arm 26 via a joint 36.

The respective joints 30, 32, 34 and 36 are rotatable around axes X1, X2, X3 and X4, respectively, by motors 40 through reduction gear units 42. The first arm 22 can rotate relative to the base 20 around the axis X1 at the joint 30. The second arm 24 can rotate relative to the first arm 22 around the axis X2 at the joint 32. The third arm 26 can rotate relative to the second arm 24 around the axis X3 at the joint 34. The wrist part 28 can rotate relative to the third arm 26 around the axis X4 at the joint 36. The configuration and operation of such a multiple joint robot 10 is widely known in the art, and therefore a further description of which will be omitted herein.

Figure 2:
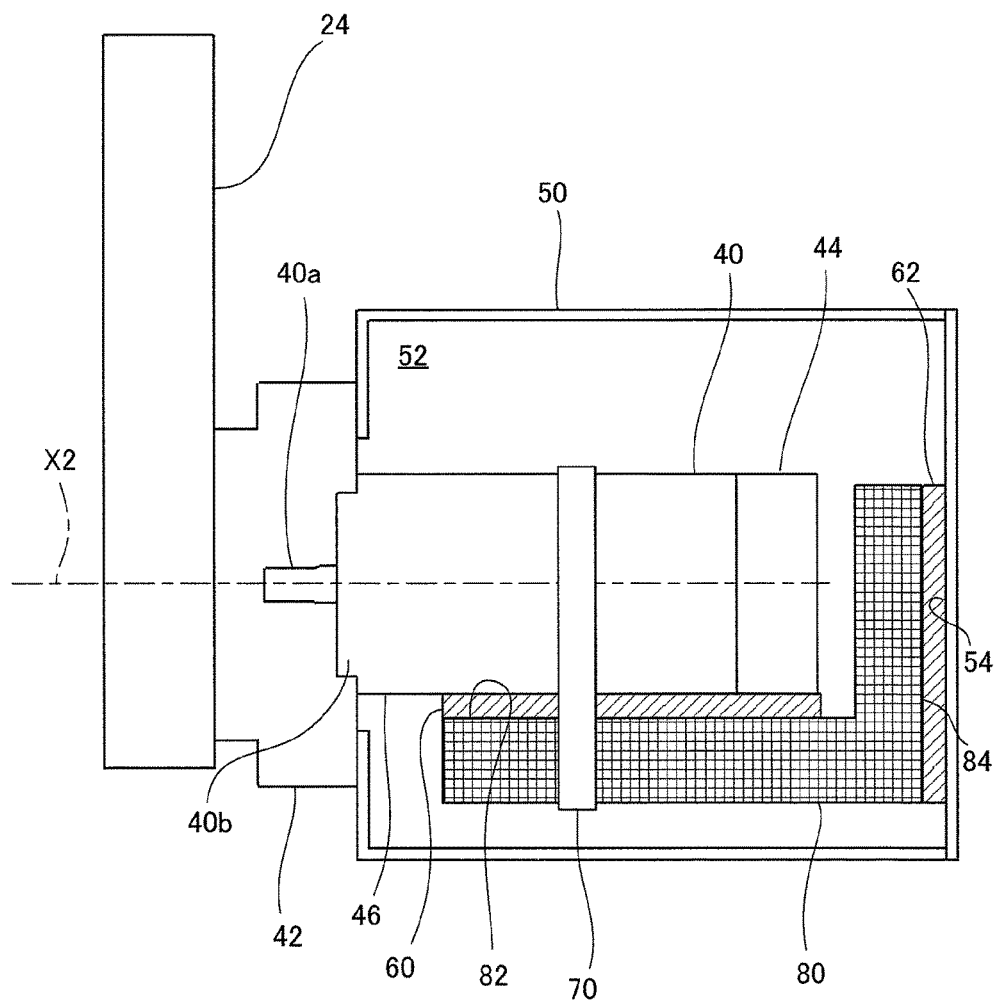
FIG. 2 is a partially enlarged view illustrating a region II shown in FIG. 1.

FIG. 2 is a partially enlarged view illustrating a region II shown in FIG. 1. The region II represents the joint 32 shown in FIG. 1 and its surroundings. Although a driving unit of the joint 32 will be described below by way of example, it is self-evident that the present embodiments may also apply to any other joints 30, 34 and 36.

A driving unit of the joint 32 includes the second arm 24 as an example of a movable body, a motor 40 for generating power to actuate the second arm 24, and a motor housing 50 for defining an interior 52 in which the motor 40 is accommodated. The motor 40 is isolated from the exterior by the motor housing 50, so that the motor 40 is protected from direct exposure to dust and splashes, etc., which may exist in the peripheral environment. The motor 40 includes an output shaft 40a, through which rotational power generated at the motor 40 is output to the reduction gear unit 42. The reduction gear unit 42 has an input part and an output part, which are not illustrated. The reduction gear unit 42 is coupled to the output shaft 40a of the motor 40 at the input part, while coupled to the second arm 24 at the output part. Rotational power provided by the motor 40 is transmitted to the second arm 24 after decelerated by the reduction gear unit 42 at a predetermined deceleration ratio. On the opposite side of the output shaft 40a, the motor 40 is provided with an encoder 44, by which information regarding movement of the motor 40 such as a rotational position or rotational velocity is detected.

The motor 40 generates heat during its operation. The heat generated from the motor 40 is released to the peripheral environment through an outer surface of the motor 40. For example, heat is conducted to other components of the robot 10, such as the reduction gear unit 42 and the second arm 24, through an attachment part 40b of the motor 40 situated on the axis X2. In the present embodiment, since the motor 40 is isolated from the exterior by the motor housing 50, a heat releasing effect achieved by a gas existent in the surroundings of the motor 40 is not sufficient to cool the motor 40. Thus, according to the present embodiment, a cooling structure is further provided, in addition to the heat conducting path through the attachment part 40b of the motor 40, in order to dissipate heat from the motor 40 and to cool the motor 40.

The cooling structure in the present embodiment includes a heat conductor 80 situated in the interior 52 of the motor housing 50 and forming a heat conducting path which extends from the motor 40 to the motor housing 50. The heat conductor 80 is formed from a material with good heat conductivity and rigidity, for example, metal such as aluminum. The heat conductor 80 is a plate having an L-shape in cross section which is formed from a pair of flat plates combined together so as to form an angle therebetween, such as a right angle as shown in FIG. 2. Although the heat conductor 80 defines a right angle in the illustrated embodiment, the angle may vary, depending on an angle between the heat generating surface 46 of the motor 40 and the inner surface 54 of the motor housing 50. The heat conductor 80 has a first contact surface 82 which is in contact with the heat generating surface 46 of the motor 40 through an elastically deformable heat conducting sheet 60, and a second contact surface 84 which is in contact with the inner surface 54 of the motor housing 50 extending substantially perpendicular to the heat generating surface 46, likewise through an elastically deformable heat conducting sheet 62. The heat conducting sheets 60 and 62 exhibit good heat conductivity. As an alternative to the heat conducting sheets 60 and 62, grease with good heat conductivity may be applied between the first contact surface 82 of the heat conductor 80 and the heat generating surface 46 of the motor 40 and/or between the second contact surface 84 of the heat conductor 80 and the inner surface 54 of motor housing 50. Alternatively, the heat conductor 80 may also be provided in such a way that the first contact surface 82 and the second contact surface 84 thereof are in direct contact with the heat generating surface 46 and the inner surface 54, respectively, without any intermediate element such as the heat conducting sheets 60 and 62 and grease interposed therebetween. In this fashion, the term "contact" used herein should be construed to include both cases where the two members are in direct contact with each other and where the two members are in indirect contact with each other via other intermediate elements having good heat conductivity interposed therebetween.

The heat conductor 80 is fixed by a fixture 70 in the state where the heat conductor 80 is in contact with the heat generating surface 46 of the motor 40 and with the inner surface 54 of the motor housing 50, respectively. The fixture 70 may be a string-like, band-like or block-like member to be attached around the motor 40 and the heat conductor 80. Using the fixture 70, contact between the heat conductor 80 and the motor 40 and between the heat conductor 80 and the motor housing 50 can be maintained.

A process for attaching the heat conductor 80 will now be described. First, the first contact surface 82 of the heat conductor 80 is brought into contact with the heat generating surface 46 of the motor 40. At this stage, the heat conductor 80 has yet to be secured by the fixture 70, and thus a position of the heat conductor 80 can be freely changed. Once the first contact surface 82 and the heat generating surface 46 come in contact with each other, the first contact surface 82 of the heat conductor 80 is slid on the heat generating surface 46, until the second contact surface 84 of the heat conductor 80 comes in contact with the opposed inner surface 54 of the motor housing 50. After the second contact surface 84 and the inner surface 54 are brought into contact with each other, a position of the first contact surface 82 relative to the heat generating surface 46 may be readjusted.

In this way, according to the present embodiment, the second contact surface 84 is brought into contact with the inner surface 54 of the motor housing 50 after the first contact surface 82 of the heat conductor 80 comes in contact with the heat generating surface 46 of the motor 40, by sliding the heat conductor 80 on the heat generating surface 46. For example, as in the related art, if a heat conductor is simply provided in a gap between a heat generating surface of the motor and an inner surface of the motor housing, it is difficult to bring the heat conductor into close contact with the motor and the housing, since the size of such gaps could vary from one application to another. In contrast, according to the present embodiment, it is possible to adjust a position of the heat conductor 80 so as to bring the second contact surface 84 into contact with the motor housing 50, even after the first contact surface 82 of the heat conductor 80 comes in contact with the motor 40. Therefore, it is ensured that the heat conductor 80 is sufficiently in close contact with both of the motor 40 and the motor housing 50. Once the heat conductor 80 is positioned in place, the heat conductor 80 can be secured by the fixture 70. In this way, the contact between the heat conductor 80 and the motor 40 and between the heat conductor 80 and the motor housing 50 can be maintained.

It should be noted that a sequence of the process can be altered such that the second contact surface 84 of the heat conductor 80 is first brought into contact with the inner surface 54 of the motor housing 50, and then, the first contact surface 82 is brought into contact with the heat generating surface 46 of the motor 40. In this case, the heat conductor 80 is slid on the inner surface 54 of the motor housing 50. In addition, in the case where an intermediate element such as the heat conducting sheets 60 and 62 is interposed between the heat conductor 80 and the motor 40 and between the heat conductor 80 and the motor housing 50, it is advantageous in that contact between these members can be easily maintained.

Next, other embodiments will be described. In the following, matters which have already been described will be omitted from the explanation as necessary. Like elements are designated with the same referential numerals.

Figure 3:
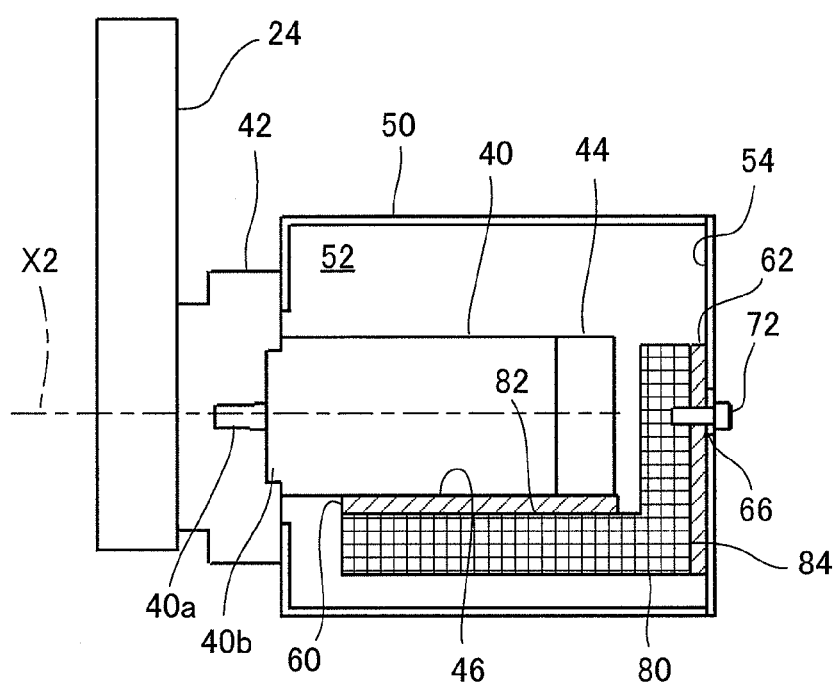
FIG. 3 is a partially enlarged view illustrating a multiple joint robot according to a second embodiment, corresponding to FIG. 2.
Figure 4:
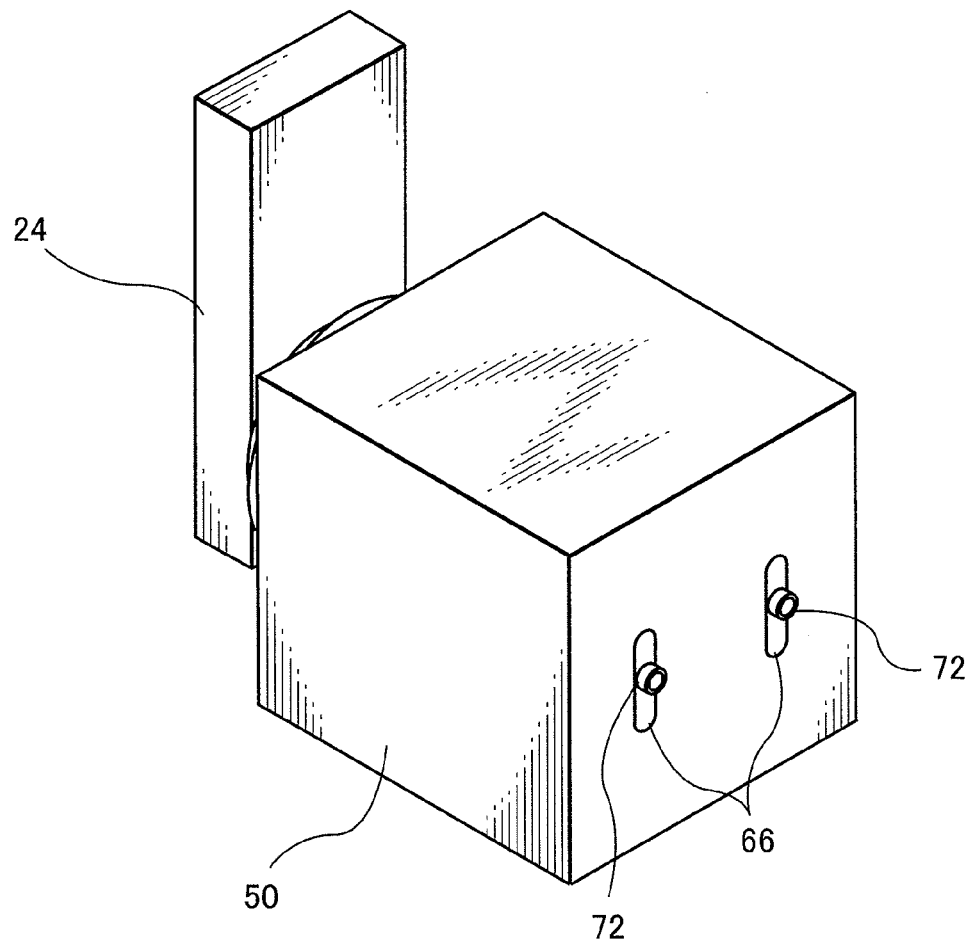
FIG. 4 is an enlarged perspective view illustrating the multiple joint robot according to the second embodiment.

FIG. 3 is a partially enlarged view illustrating a multiple joint robot according to a second embodiment, corresponding to FIG. 2. FIG. 4 is an enlarged perspective view illustrating the multiple joint robot according to the second embodiment. In the present embodiment, a position adjustable attachment is provided to the motor housing 50 in order to fix the heat conductor 80 to the motor housing 50 and to adjust a position of the heat conductor 80.

By way of example, a position adjustable attachment is shown in FIG. 3, which includes bolts 72 and elongated bores 66 formed in a wall of the motor housing 50, to which the bolts 72 can be inserted. In the illustrated embodiment, two assemblies of the bolts 72 and the elongated bores 66 are arranged side by side. The elongated bores 66 are formed so as to have an elongated shape in a direction substantially perpendicular to the heat generating surface 46 of the motor 40 (an upper/lower direction in the FIGS. 3 and 4). The heat conductor 80 is provided with threaded holes configured to receive the bolts 72. The heat conductor 80 can be secured to the motor housing 50 by screwing the bolts 72 into the threaded holes of the heat conductor 80 through the elongated bores 66.

In the present embodiment, prior to the heat conductor 80 being fixed to the motor housing 50 by the bolts 72, a position of the heat conductor 80 can be freely adjusted within a range in which the elongated bores 66 and the threaded holes of the heat conductor 80 overlap. Thus, even after the heat conductor 80 comes in contact with the heat generating surface 46, a position of the heat conductor 80 is still adjustable by loosening fastening force by the bolts 72 so as to allow the heat conductor 80 to be slid on the heat generating surface 46 of the motor 40. In this way, according to the present embodiment, after the first contact surface 82 of the heat conductor 80 comes in contact with the opposed heat generating surface 46 of the motor 40, it is still possible to adjust a position of the second contact surface 84 relative to the inner surface 54 of the motor housing 50.

Figure 5:
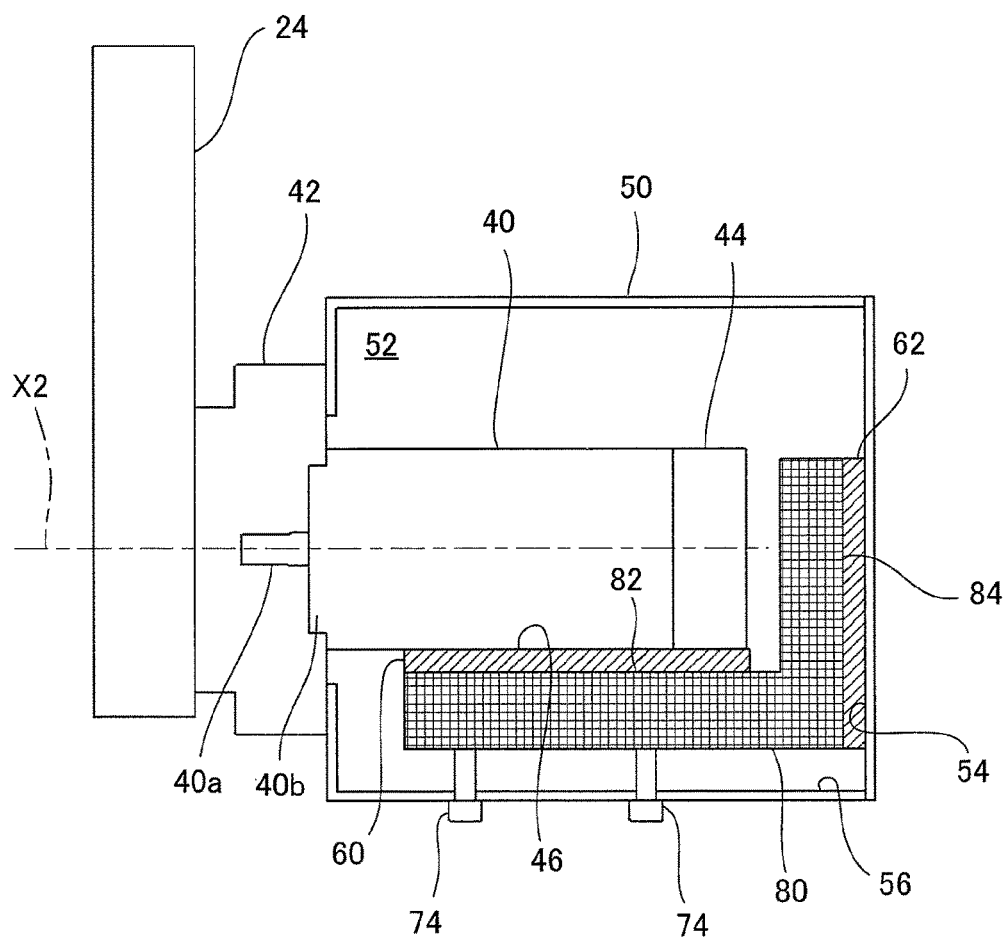
FIG. 5 is a partially enlarged view illustrating a multiple joint robot according to a third embodiment, corresponding to FIG. 2.

FIG. 5 is a partially enlarged view illustrating a multiple joint robot according to a third embodiment, corresponding to FIG. 2. In the present embodiment, the heat conductor 80 is the same as those of the first and second embodiments. However, the heat conductor 80 is fixed in the state where the first contact surface 82 thereof is pressed against the heat generating surface 46 of the motor 40 by bolts 74. The bolts 74 penetrate threaded holes (not shown) extending through an inner surface 56 of the motor housing 50 facing the heat generating surface 46 of the motor 40, and therefore the bolts 74 protrude into the interior 52. Accordingly, a position of the first contact surface 82 of the heat conductor 80 can be adjusted in relation to the heat generating surface 46 of the motor 40, by changing a length of protrusion of the bolts 74 into the interior 52.

According to the present embodiment, after the second contact surface 84 of the heat conductor 80 is brought into contact with the inner surface 54 of the motor housing 50, the heat conductor 80 can be slid on the inner surface 54 by changing a protruding length of the bolts 74 into the interior 52. In this way, contact between the heat conductor 80 and the heat generating surface 46 and between the heat conductor 80 and the inner surface 54 can be ensured.

Figure 6:
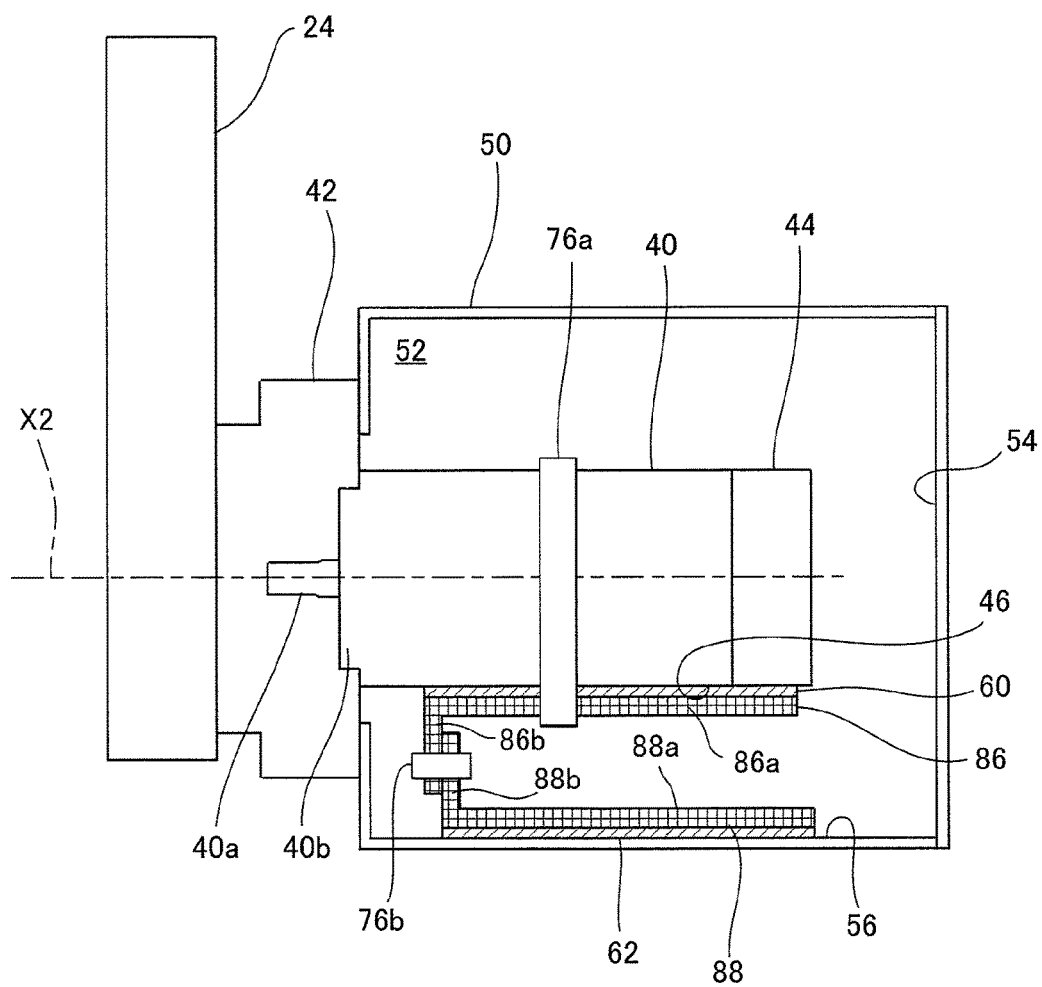
FIG. 6 is a partially enlarged view illustrating a multiple joint robot according to a fourth embodiment, corresponding to FIG. 2.

FIG. 6 is a partially enlarged view illustrating a multiple joint robot according to a fourth embodiment, corresponding to FIG. 2. In the present embodiment, the heat conductor 80 includes a first heat conductor 86 and a second heat conductor 88. The first heat conductor 86 is a member of L-shape in cross section which includes a parallel portion 86*a* having a first contact surface 82 and extending parallel to the heat generating surface 46 of the motor 40, and an orthogonal portion 86*b* extending from an end of the parallel portion 86*a* substantially at a right angle toward an inner surface 56 of the motor housing 50 which extends parallel to the heat generating surface 46. The first heat conductor 86 and the second heat conductor 88 may have the same dimension or different dimensions.

The parallel portion 86*a* of the first heat conductor 86 is fixed to the motor 40 by a first fixture 76*a*, while its first contact surface 82 is in contact with the heat generating surface 46 of the motor 40. The orthogonal portion 86*b* of the first heat conductor 86 and the orthogonal portion 88*b* of the second heat conductor 88 are in contact with each other and fixed to each other by a second fixture 76*b*. In this way, according to the present embodiment, the first heat conductor 86 and the second heat conductor 88 can remain in contact with the motor 40 and the motor housing 50 by the first fixture 76*a* and the second fixture 76*b*, respectively.

In the present embodiment, the first heat conductor 86 is first brought into contact with the motor 40. During this process, the first fixture 76*a* has yet to be secured, and thus a position of the first heat conductor 86 can be freely adjusted. Then, the first heat conductor 86 is fixed to the motor 40 by the first fixture 76*a*, while the first contact surface 82 of the first heat conductor 86 is in contact with the heat generating surface 46 of the motor 40.

Subsequently, the second heat conductor 88 is brought into contact with the inner surface 56 of the motor housing 50. During this process, the second heat conductor 88 has yet to be fixed, and thus a position of the second heat conductor 88 can be freely adjusted. After the second contact surface 84 is brought into contact with the inner surface 56, the second heat conductor 88 is slid on the inner surface 56, until the orthogonal portion 88*b* of the second heat conductor 88 comes in contact with the orthogonal portion 86*b* of the first heat conductor 86.

When the orthogonal portion 86*b* of the first heat conductor 86 and the orthogonal portion 88*b* of the second heat conductor 88 are brought into contact with each other so as to allow for sufficient heat conduction therebetween, the first heat conductor 86 and the second heat conductor 88 are fixed to each other by securing the second fixture 76*b* to the orthogonal portions 86*b* and 88*b*. In this way, the contacting states can be maintained between the first heat conductor 86 and the motor 40, between the second heat conductor 88 and the motor housing 50 and between the first heat conductor 86 and the second heat conductor 88, respectively. According to the present embodiment, it is ensured that a heat conductive path can be established between the heat generating surface 46 of the motor 40 and the inner surface 56 of the motor housing 50 which extends parallel to the heat generating surface 46. Although the exemplary configuration in which the first heat conductor 86 is fixed first, and the second heat conductor 88 is then slid on the inner surface 56 of the motor housing 50 has been described above, another configuration may be employed, in which the first heat conductor 86 and the second heat conductor 88 are coupled to each other by sliding the first heat conductor 86 on the heat generating surface 46 of the motor 40 after the second heat conductor 88 is fixed to the motor housing 50.

Figure 7:
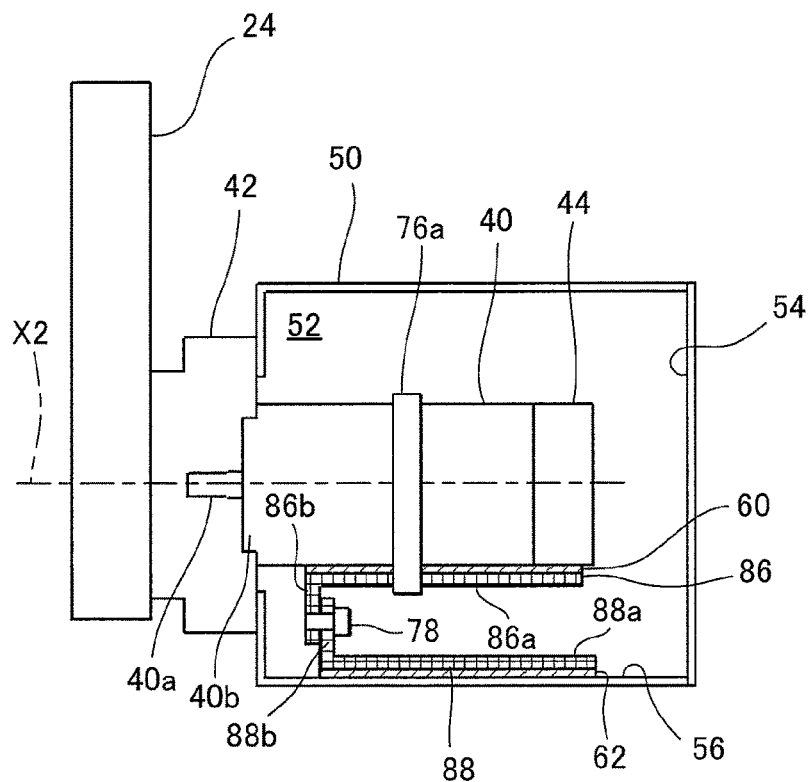
FIG. 7 is a partially enlarged view illustrating a multiple joint robot according to a fifth embodiment, corresponding to FIG. 2.
Figure 8:
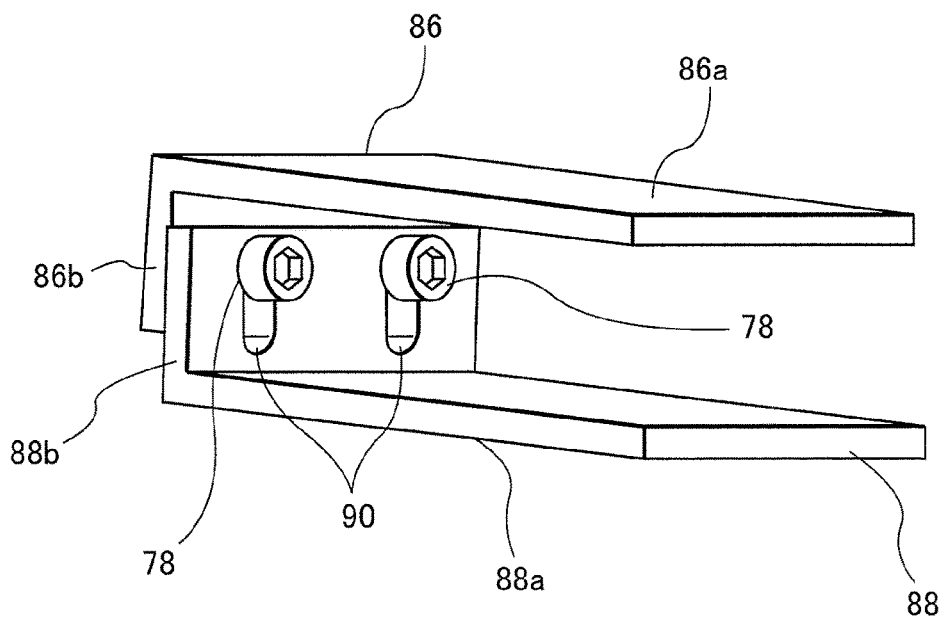
FIG. 8 is an enlarged perspective view illustrating a heat conductor shown in FIG. 7.

FIG. 7 is a partially enlarged view illustrating a multiple joint robot according to a fifth embodiment, corresponding to FIG. 2, and FIG. 8 is an enlarged perspective view illustrating the heat conductor shown in FIG. 7. In the present embodiment, similarly as the fourth embodiment, a heat conductive path is established by the first heat conductor 86 and the second heat conductor 88. As means for fixing the first heat conductor 86 and the second heat conductor 88, instead of the first second fixture 76b, bolts 78 are used in the present embodiment. As shown more clearly in FIG. 8, two elongated bores 90 spaced apart from each other are provided in the orthogonal portion 88b of the second heat conductor 88. The respective elongated bores 90 are formed so as to have an elongated shape in a direction substantially perpendicular to the second contact surface 84. The orthogonal portion 86b of the first heat conductor 86 is provided with threaded holes for receiving the bolts 78. This allows the first heat conductor 86 and the second heat conductor 88 to be fixed to each other by screwing the bolts 78 to the threaded holes of the first heat conductor 86 through the elongated bores 90 of the second heat conductor 88.

In the same way as the fourth embodiment described above, the first heat conductor 86 is fixed by the first fixture 76a while contacting with the motor 40. When positioning the second heat conductor 88, the second heat conductor 88 has yet to be secured, a position of the second heat conductor 88 relative to the inner surface 56 of the motor housing 50 can be adjusted by changing a fastened position of the bolts 78 in the elongated bores 90. While the second contact surface 84 of the second heat conductor 88 is in contact with the inner surface 56, the second heat conductor 88 is fastened with the first heat conductor 86 by the bolts 78. In this way, the contacting states can be maintained between the first heat conductor 86 and the motor 40, between the second heat conductor 88 and the motor housing 50, and between the first heat conductor 86 and the second heat conductor 88, respectively. Although the elongated bores 90 are provided in the second heat conductor 88, the first heat conductor 86 may be instead provided with similar elongated bores.

Although various embodiments of the present invention have been described above, it is evident to a person skilled in the art that the present invention can also be implemented by any combination of features of the embodiments either explicitly or implicitly disclosed herein. An arm is illustrated by way of example as a movable object, but a swing table may be used as a movable object. Although the embodiments in which the motor has a flat heat generating surface have been described for simplification, a scope of the present invention also extends to the case where the heat generating surface is not flat, but may be curved, for example.

Effect of the Invention

According to the first aspect, a position of the heat conductor can be adjusted by sliding at least one of the first contact surface and the second contact surface of the heat conductor on the opposed heat generating surface or inner surface. Thus, even after one of the first contact surface and the second contact surface is brought into contact with the motor or the motor housing, a position of the other contact surface can be still adjusted. Therefore, for example, even in the case where the heat conductor has varied thicknesses, where the motor housing has a rough inner surface or an inclined inner surface, or where a gap between the motor and the motor housing is not constant, the heat conductor can be still brought into close contact with both of the motor and the motor housing.

According to the second aspect, one of the contact surfaces is brought into contact with the opposed heat generating surface or inner surface by sliding the other of the contact surfaces on the opposed heat generating surface or inner surface. Accordingly, even in the case where the heat generating surface of the motor and the inner surface of the motor housing incline relative to each other, the heat conductor can be still brought into close contact with both of the motor and the motor housing.

According to the third aspect, the first heat conductor and the second heat conductor are brought into contact with each other by sliding one of the first heat conductor and the second heat conductor on the opposed heat generating surface or inner surface. Therefore, even in the case where the heat generating surface of the motor and the inner surface of the motor housing extend parallel to each other, close contact can be realized between the first heat conductor and the motor, between the second heat conductor and the motor housing, and between the first heat conductor and the second heat conductor, respectively.

Although the invention has been shown and described with exemplary embodiments thereof, it should be understood by a person skilled in the art that the foregoing and various other changes, omissions and additions may be made therein and thereto without departing from the spirit and scope of the invention.

The invention claimed is:

1. A manufacturing process for manufacturing a multiple joint robot,
   the multiple joint robot comprising:
      a movable body;
      a motor for generating power to actuate the movable body;
      a motor housing accommodating the motor in an interior of the motor housing so as to isolate the motor from an exterior; and
      a heat conductor situated in the interior of the motor housing and forming a heat conducting path for conducting heat from the motor to the motor housing,
   the manufacturing process comprising:
      sliding at least one of a first contact surface and a second contact surface of the heat conductor on an opposed heat generating surface on a side of a motor body or an opposed inner surface of the motor housing, such that the first contact surface of the heat conductor comes in contact with the heat generating surface and the second contact surface of the heat conductor comes in contact with the inner surface of the motor housing, so as to adjust a position of the heat conductor; and
      thereafter fixing the heat conductor by a fixture so as to form the heat conducting path.

2. The manufacturing process according to claim 1, wherein the heat generating surface of the motor and the inner surface of the motor housing extend in an inclined manner relative to each other, and the first contact surface and the second contact surface of the heat conductor extend in an inclined manner relative to each other so as to form an angle therebetween, the manufacturing process comprising:

sliding one of the first contact surface and the second contact surface of the heat conductor on the opposed heat generating surface of the motor or inner surface of the motor housing until the other of the first contact surface and the second contact surface comes in contact with the opposed heat generating surface of the motor or inner surface of the motor housing; and thereafter fixing the heat conductor by the fixture so as to form the heat conducting path.

3. The manufacturing process according to claim 1, wherein the heat generating surface of the motor and the inner surface of the motor housing extend parallel to each other, the first contact surface and the second contact surface of the heat conductor extend parallel to each other, and the heat conductor includes a first heat conductor forming the first contact surface and a second heat conductor separate from the first heat conductor, the second heat conductor forming the second contact surface, the manufacturing process comprising:

sliding one of the first contact surface of the first heat conductor and the second contact surface of the second heat conductor on the opposed heat generating surface of the motor or inner surface of the motor housing until the first heat conductor and the second heat conductor come in contact with each other; and thereafter fixing the first heat conductor and the second heat conductor by the fixture so as to form the heat conducting path.

* * * * *